United States Patent Office 3,254,692
Patented June 7, 1966

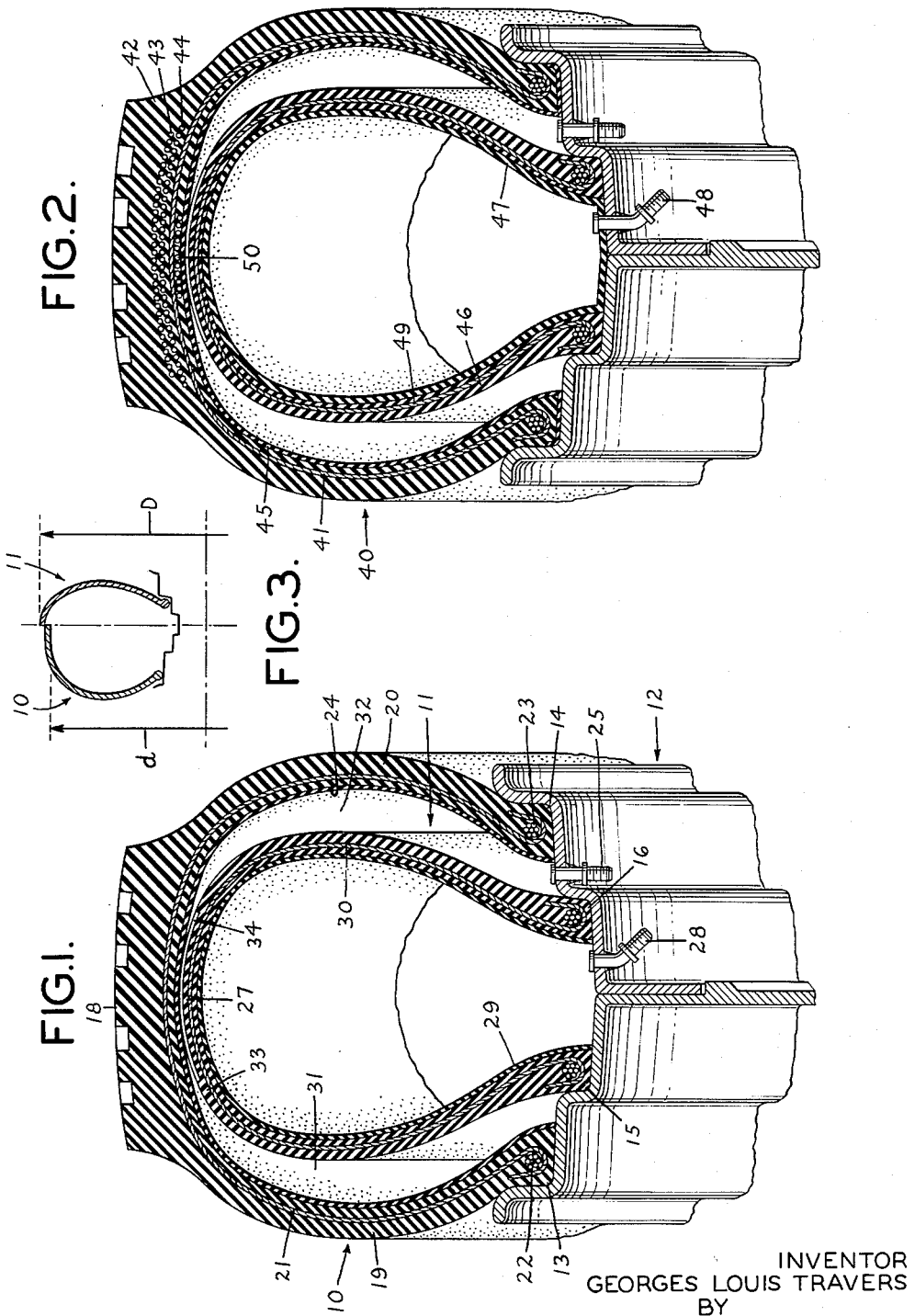

3,254,692
PNEUMATIC TIRE CASINGS
Georges Louis Travers, Clermont-Ferrand, France, assignor to Compagnie Generale des Etablissements Michelin, raison sociale Michelin & Cie, Clermont-Ferrand, France
Filed June 1, 1964, Ser. No. 371,254
Claims priority, application France, June 4, 1963, 936,993
9 Claims. (Cl. 152—340)

This invention relates to improvements in pneumatic tires and in particular to tires having inner and outer casings constructed and arranged to carry heavy loads on vehicles such as trucks, buses, earth-working equipment and other on and off-highway heavy duty vehicles.

It is usual with heavy duty vehicles of the type mentioned above to provide the single or dual rear axles on such vehicles with dual wheels. Such dual wheels distribute the load among the tires and distribute the load over the roadway. Dual wheels are recognized as having certain disadvantages which are inherent in their relation. The pair of wheels at each end of the axle must be spaced apart sufficient distance to prevent rocks and other material from being trapped between the tires. This arrangement substantially increases the tread width of the vehicle. Moreover, inasmuch as the dual wheels are rigidly connected to each other they do not bear equal loads when traveling over rough roads or rough terrain and as a result the wear on the tires is unequal. Moreover, inasmuch as the wheels and tires of each pair rotate together, sliding of the tires always occurs when negotiating a turn because of the unequal radii of the curves which they traverse. In addition, the use of dual wheels for the front or steering wheels is impractical unless special devices, such as power steering and the like are provided to overcome the resistance of such dual wheels to changes in direction. Nevertheless, dual wheels have been the best solution to the problem of carrying heavy loads on the highways.

Another but less satisfactory solution, in many instances, is to provide tires of large diameter and large cross-section such as those used on earth-working equipment, tractors and the like. Such tires are not practical, because of their size, for trucks, buses and other similar vehicles.

It has been proposed heretofore to provide tires with an inner tube-like casing for safety purposes. In these "safety tires," the inner tube or casing is usually spaced from the side and tread portions of the tire casing and come into use only when the outer casing is partially or completed deflated as by a puncture or blowout. It has also been proposed to provide an inner casing which is inflated to a higher pressure than that in the outer casing, but is spaced from the outer casing when the outer casing is not under load. When a sufficient load is applied, the portion of the tread of the outer casing in engagement with the ground is flexed into engagement with the inner casing and some of the load then is carried by the inner casing. However, sliding friction between the inner and outer casings is developed under load-carrying conditions which causes overheating of the tires with consequent deterioration. In order to avoid sliding friction, it has been proposed to interconnect the inner and outer casings by means of a band or web of rubber or the like in the tread zone. This expedient has not proved satisfactory for the reason that heat is also developed by stressing of the connection between the tires. Moreover, almost insuperable difficulties are encountered in the manufacture of such dual casings and the installation of such casings on vehicle wheels.

In accordance with the present invention, dual pneumatic tire casings are provided which overcome the disadvantages of dual wheels, provide excellent load carrying capacity, long wear, and a minimum of overheating in use.

More particularly, tires and vehicle wheels of the type embodying the present invention include an outer casing which may be any of a number of types known in the art and an inner casing which is dimensioned and related to the outer casing so that it bears a sufficient proportion of the load to relieve overloading of the outer casing and consequent rapid wear thereof. The inner casing in constructed and arranged so that its external diameter when mounted on a wheel rim is somewhat greater than the internal diameter of the outer casing when mounted on the rim so that the inner casing bears against the outer casing throughout a zone extending around the equatorial perimeter of the outer casing. Further, the inner casing is constructed with a transverse profile narrower than the internal profile of the outer casing and contact between the side portions of the tire casings is prevented and air spaces are provided between the casings, thereby reducing friction and avoiding excessive heating of the tires. As a further factor in the operation of such concentric dual casings, the inner casing is inflated to a higher pressure than the outer casing in an amount which advantageously may be substantially equal to the inflation pressure of the outer casing. In this way, the stresses on the two casings produced by inflation are substantially equal, although the inner casing is inflated to a higher pressure than the outer casing.

In a typical concentric casing structure of the type embodying the present invention, the wheel rim is provided with separate inflation valves for the outer and inner casings and the outer casing is a tubeless type of tire casing, while the inner casing may either be a tubeless or tube-containing tire casing.

The carcass structures of the two casings may be the same or different although in most instances differences are required in order to maintain the different profiles of the inner and outer casings as mentioned above. Preferably the angles of the different plies of cords or wires, hereinafter referred to generally as cords, are different in the inner and outer casing. For example, the inside casing may include a carcass of radial cords or biased laid cords forming with the equatorial plane a relatively large angle, in any case greater than the angle of inclination of the cords in the outer tire casing. The reason for this is to obtain a greater height and narrower width of the inner casing than the height and width of the outer casing.

As an alternative, both casings can include carcasses composed of essentially radially directed cords. In this case, the outer casing has a substantially transversely rigid but radially flexible tread or tread reinforcement composed of crossed plies of parallel cords. Further, the outer casing may be provided with a band of circumferentially extending cords which limit the radial expansion or deflection of the outer casing and aid in maintaining its cross-sectional shape or profile.

Inasmuch as the inner casing bears at all times against the inside of the outer casing at the equatorial zone of the outer casing, relatively little sliding friction is developed during the operation of the tires and this friction can be further reduced by introducing a lubricant which is not harmful to rubber between the casings or providing the engaging portion of the casings with a layer or layers of relatively low frictional rubber or other elastomer. It is also desirable to maintain the air-containing spaces between the side portions of the inner and outer casings in communication with each other. To that end, the crown portion of the inner tire casing may be provided with transversely extending grooves which further aid in reducing the amount of heat developed in the operation of the tire and maintain a proper relation between the inflation pressures on opposite sides of the inner casing.

For a better understanding of the present invention, reference may be had to the accompanying drawings, in which FIGURE 1 is a view in cross-section through a portion of a typical dual tire unit including a wheel rim embodying the present invention;

FIGURE 2 is a view in cross-section through a portion of a modified form of dual tire unit embodying the present invention; and FIGURE 3 is a schematic illustration of the relative sizes and profiles of the inner and outer casings.

As shown in FIGURE 1, a typical tire unit embodying the present invention includes an outer tubeless tire casing 10 and an inner tubeless tire casing 11 mounted on a wheel rim 12 provided with an outer pair of bead seats 13 and 14 and an inner pair of bead seats 15 and 16. The outer casing 10 is of a substantially conventional profile having a wide and flat tread portion 18, convex side portions 19 and 20 reinforced by means of a carcass 21 which extends behind the tread to the beads 22 and 23 which may be reinforced in any of the usual ways. An air impervious liner 24 of butyl or neoprene rubber or the like prevents leakage of air from the casing. A tire inflation valve 25 is mounted in the rim so that the outer casing 10 may be inflated independently and to a different pressure than the inner casing 11. As illustrated in FIGURES 1 and 3, the inner casing 11 has a different profile than the outer casing 10, that is, the outside diameter D of the finished inner casing is greater than the external diameter d and the internal diameter of the tire casing 10. Also, the internal or bead diameter of the inner casing 11 is smaller than the internal or bead diameter of the casing 10 so that when they are mounted on the rim 12, the crown portion 27 of the inner casing bears against and supports the tire casing 10 throughout a zone of substantial width extending circumferentially of the outer casing. As a result, the inner casing exerts a radial pressure on the outer casing 10 even when they are uninflated. The inner casing is inflated to a pressure higher than the pressure in the outer casing by means of a separate tire inflation valve 28 also mounted in the rim in the case of a tubeless tire. As illustrated, the inner casing 11 is a tubeless tire having an inner air impervious liner 29. In practice, the inner casing 11 is inflated to about twice the pressure of the air in the outer casing. In this way, the stresses on the casings developed by the internal pressure in the casings are essentially equal for the reason that the pressure between the tire casings 10 and 11 reacts against the higher pressure in the inner casing.

In order to provide the desired tire profiles, the carcass structure and tread structures of the tire casings are different. Thus, the carcass 21 of the outer tire casing is composed of two plies of parallel cords (only one of which is shown) arranged so that the cords in one ply cross the cords in the other ply and the cords in both plies form angles of between about 8° and 40° with the equatorial plane of the tire casing.

The inner casing 11 may have a carcass also formed of two plies, each composed of parallel cords with the two plies arranged in crossed relation and their cords forming with the equatorial plane an angle of about 60° to 80°. This arrangement of the cords enables the outer casing 10 to be formed with a flatter and wider cross-section while the inner casing 11 can be formed with a narrower cross-section and greater cross-sectional diameter than the casing 10.

Communication is maintained between the air spaces 31 and 32 between the sides of the casings 10 and 11 by providing the crown portion 33 of the inner casing with a series of transverse grooves 34 inclined to the equatorial plane of the casing or in nay other relation thereto. Moreover, friction between the engaging surfaces of the tire casing is reduced by introducing a suitable lubricant for rubber between the casing. Also, the outer surface of the inner casing or the inner surface of the outer casing or both may be provided with a film or layer of a low friction elastomer.

FIGURE 2 discloses a modified form of tire unit embodying the present invention in which the tire casing 40 is provided with a carcass 41 composed of parallel cords extending perpendicular to the equatorial plane and radially of the casing. The tread 42 is reinforced by means of at least two plies 43 and 44 of crossed cords forming with the carcass cords 41 a triangulated structure which has great resistance to lateral deflection but is readily flexible in a radial direction. A liner of air impervious elastomer 45 in the inside of the outer tire casing seals the casing against leakage. A tube-containing inner casing 46 having a profile generally the same as that disclosed in FIGURE 1 is mounted within the outer casing 40 and contains an inner tube 47 which can be inflated by means of an inflating valve 48 attached to the inner tube. In the casing 46, the carcass 49 is composed of a single ply of radially extending cords. In order to aid in maintaining the desired profile, particularly in the tread zone of the outer casing, an additional narrow ply 50 of circumferentially extending cords is provided which substantially spans the zone of contact between the inner casing 46 and the outer casing 40. In this way, the tread surface of the outer casing can be transversely slightly convex, flat, or even curved concavely, depending upon requirements. The reinforcing plies 43, 44 and 49 will maintain the selected tread contour or profile so that the tread wears relatively uniformly.

It will be apparent that with the tire structures disclosed herein, the inner casing carries a large proportion of the load exerted on the outer casing, thereby preventing overloading of the outer casing and avoiding the wear and deterioration which is recognized as occurring in overloaded tires. Moreover, the concentric arrangement of the casings enables the outer casing to be inflated to a suitable operating pressure and at the same time enables the inner casing to be inflated to a higher pressure than the outer casing without increasing the internally applied stresses on the inner casing beyond a reasonable and acceptable value.

Inasmuch as the inner and outer casings individually are of generally the same structures as conventional tire casing, they can be manufactured by conventional tire manufacturing procedures and with conventional equipment and they can be installed readily upon the rims of the wheels of the split rim base type as shown in the drawings or of the demountable flange type (not shown).

Tire units embodying the present invention can be readily manufactured in various sizes and with various profiles as required and can be varied in their carcass structure, the tread and sidewall structure and design and in the tread and bead reinforcements. Accordingly, the forms of the invention described above should be considered as illustrative, and the invention should not be considered as limited other than as defined in the claims.

I claim:

1. A pneumatic tire for a vehicle wheel having a rim comprising an outer casing including opposite side zones, a tread zone between said side zones and a bead at an inner edge of each side zone for engaging the rim of a vehicle wheel, a separate inner casing having opposite side zones, a crown portion between said side zones and a bead at an inner edge of each side zone for engaging said rim of said vehicle wheel, said inner casing having an exterior transverse width less than the interior transverse width of said outer casing and an external diameter greater than the internal diameter of said outer casing such that when the beads of said casings engage said rim and the casings are inflated, the crown of said inner casing engages the interior of outer casing at the tread zone thereof and the said side zones of the inner casings are spaced from the side zones of said outer casing.

2. The tire set forth in claim 1 in which said outer casing includes a carcass containing bias laid plies of cords and said inner casing includes a carcass of radially extending cords.

3. The tire set forth in claim 1 in which said inner and outer casings include carcasses of radially extending cords.

4. The tire set forth in claim 3 in which said outer casing comprises a radially flexible and a transversely substantially rigid tread reinforcement.

5. The tire set forth in claim 1 in which said inner and outer casings include carcasses of bias-laid cords, the cords in the inner casing forming with the equatorial plane of said casings an acute angle greater than the carcass cords of said outer casing.

6. A pneumatic vehicle tire and wheel, comprising a wheel rim having a first pair of spaced apart annular seats for receiving the beads of a pneumatic tire casing, a second pair of annular bead-receiving seats between said first pair of seats, a first pneumatic tire casing having beads engaging said first pair of seats, side zones united with said beads and a ground-engaging tread zone united with and between said side zones, a second separate pneumatic casing having beads engaging said second pair of seats, side zones united with said beads and a crown zone between and united with said side zones, said second casing having an external diameter greater than the internal diameter of said outer casing and a maximum transverse external width less than the minimum internal width of said outer casing to maintain at least a circumferentially extending portion of the crown zone of said inner casing in engagement with the interior of said outer casing at the tread zone, and the adjacent side zones of said inner and outer casings in spaced apart relation when said casings are inflated and their beads are engaged with their respective seats.

7. The tire and wheel set forth in claim 6 comprising air-tight liners in said inner and outer casings and separate inflating valves in said rim for inflating each of said casings.

8. The tire and wheel set forth in claim 6 in which the diameter of said first pair of seats is greater than the diameter of the second pair of seats.

9. The tire and wheel set forth in claim 6 comprising grooves extending transversely of said crown zone for reducing frictional engagement of said crown zone with the interior of said outer casing.

References Cited by the Examiner
UNITED STATES PATENTS

| | | | |
|---|---|---|---|
| 1,202,000 | 10/1916 | McMahan et al. | 152—355 |
| 1,653,054 | 12/1927 | Mack | 152—340 X |
| 2,045,341 | 6/1936 | Bourdon | 152—340 |
| 2,780,266 | 2/1957 | McLeod | 152—340 |
| 2,874,742 | 2/1959 | Lugli | 152—176 |

FOREIGN PATENTS 733,936   7/1955   Great Britain.

EUGENE G. BOTZ, *Primary Examiner.*

ARTHUR L. LA POINT, *Examiner.*

C. W. HAEFELE, *Assistant Examiner.*